(12) United States Patent
Tindall (10) Patent No.: US 7,719,457 B1
(45) Date of Patent: May 18, 2010

(54) DIGITALLY TUNED DIGITAL RADIO FREQUENCY MEMORY

(75) Inventor: Jeffrey A. Tindall, Pleasanton, CA (US)

(73) Assignee: Teledyne Cougar, Inc., Sunnyvale, CA (US)

( * ) Notice: Subject to any disclaimer, the term of this patent is extended or adjusted under 35 U.S.C. 154(b) by 0 days.

(21) Appl. No.: 12/338,617

(22) Filed: Dec. 18, 2008

(51) Int. Cl.
G01S 7/38 (2006.01)
(52) U.S. Cl. .............. 342/14; 342/15; 342/21; 342/194; 342/195
(58) Field of Classification Search .......... 342/13–15, 342/21, 194, 195; 455/1
See application file for complete search history.

(56) References Cited

U.S. PATENT DOCUMENTS

| | | | | |
|---|---|---|---|---|
| 5,614,903 A * | 3/1997 | Oyama | ............... | 341/118 |
| 5,822,366 A * | 10/1998 | Rapeli | ............... | 375/219 |
| 6,762,712 B2 * | 7/2004 | Kim | ............... | 342/135 |
| 6,765,563 B2 * | 7/2004 | Eglit et al. | ............... | 345/213 |
| 6,829,311 B1 * | 12/2004 | Riley | ............... | 375/326 |
| 2002/0128039 A1 * | 9/2002 | Finn | ............... | 455/556 |
| 2002/0168003 A1 * | 11/2002 | Richards | ............... | 375/239 |
| 2002/0176511 A1 * | 11/2002 | Fullerton et al. | ............... | 375/285 |
| 2003/0022680 A1 * | 1/2003 | Shreve | ............... | 455/504 |
| 2006/0088081 A1 * | 4/2006 | Withington et al. | ............... | 375/130 |

* cited by examiner

*Primary Examiner*—John B Sotomayor
(74) *Attorney, Agent, or Firm*—McGuireWoods LLP; Safet Metjahic (57) ABSTRACT

A digitally tuned digital radio frequency memory that captures a portion of a first radio frequency signal and retransmits the portion as a coherent radio frequency signal. The digitally tuned radio frequency memory may include a track and hold configured to track and hold the first radio frequency signal and to output a shaped signal; a digitizer configured to convert the shaped signal to a digital word; a memory configured to store the digital word; and a direct digital frequency synthesizer configured to provide a sampling clock signal, wherein the sampling clock signal is provided to the track and hold.

32 Claims, 7 Drawing Sheets

DIGITALLY TUNED DIGITAL RADIO FREQUENCY MEMORY

BACKGROUND

1. Field

This disclosure relates to a method, a system and an apparatus for storing samples of received radio frequency signals for subsequent retransmission. More particularly, the disclosure relates to a digital radio frequency memory (DRFM) that provides wideband coherent jammer coverage.

2. Related Art

Electromagnetic (EM) signals, such as Radio Frequency (RF) radar signals, can be captured and selectively retransmitted using a Digital Radio Frequency Memory (DRFM). In particular, an EM signal may be received, digitized and captured in a DRFM. Subsequently, the EM signal may be selectively replicated and retransmitted coherently with the original EM signal to create false range targets both behind and ahead of a target intended to be protected. DRFMs are frequently used in Electronic Warfare (EW) to jam or provide false information to enemy radar.

SUMMARY

In one aspect of the invention, a digitally tuned digital radio frequency memory is provided that captures a portion of a first radio frequency signal and retransmits the portion as a coherent radio frequency signal. The digitally tuned radio frequency memory comprises: a track and hold configured to track and hold the first radio frequency signal and to output a shaped signal; a digitizer configured to convert the shaped signal to a digital word; a memory configured to store the digital word; and a direct digital frequency synthesizer configured to provide a sampling clock signal, wherein the sampling clock signal is provided to the track and hold. The digitizer may comprise an input configured to receive the sampling clock signal. The digitizer may comprise a lower conversion rate analog to digital converter. The digitizer may be further configured to digitize only a baseband modulation of the first radio frequency signal. The digitizer may be further configured to remove a carrier frequency of the first radio frequency signal. The carrier frequency may be removed based on the Nyquist Theorem. The track and hold and digitizer may each be configured to receive the sampling clock signal to determine a baseband range for the first radio frequency signal. The memory may be further configured to store the digital word based on the sampling clock signal.

The digitally tuned digital radio frequency memory may further comprise: a digital to analog converter configured to convert the digital word to an intermediate frequency signal; and a multiplier configured to multiply the intermediate frequency signal to a Nyquist range. The multiplier may be further configured to multiply the intermediate frequency signal by the Nyquist range based on the sampling clock signal.

The digitally tuned digital radio frequency memory may further comprise: a Doppler direct digital frequency synthesizer configured to provide a Doppler sampling clock signal.

The digitally tuned digital radio frequency memory may further comprise: a Doppler direct digital frequency synthesizer configured to provide a Doppler sampling clock signal, wherein the memory is further configured to playback the digital word based on the Doppler sampling clock signal.

According to another aspect of the invention, a method is provided for capturing a portion of a first radio frequency signal and retransmitting the portion as a coherent radio frequency signal using a digitally tuned digital radio frequency memory. The method comprises: tracking and holding the first radio frequency signal to output a shaped signal; converting the shaped signal to a digital word; storing the digital word in a memory; and providing a sampling clock signal from a direct digital frequency synthesizer, wherein the tracking and holding is based on the sampling clock signal. The digitizing may comprise digitizing only a baseband modulation of the first radio frequency signal. The digitizing may comprise removing a carrier frequency of the first radio frequency signal. The carrier frequency may be removed based on the Nyquist Theorem. The storing may be based on the sampling clock signal. The method may further comprise providing a Doppler sampling clock signal.

The method may further comprise: providing a Doppler sampling clock signal; and reading the digital word from the memory based on the Doppler sampling clock signal.

The method may further comprise: determining a baseband range for the first radio frequency signal from the tracking and holding and digitizing based on the sampling clock signal.

The method may further comprise: converting the digital word to an intermediate frequency signal; and multiplying the intermediate frequency signal to a Nyquist range to generate the portion of the first radio frequency signal. The multiplying may be based on the sampling clock signal.

In yet another aspect of the invention, a program is provided for capturing a portion of a first radio frequency signal and retransmitting the portion as a coherent radio frequency signal using a digitally tuned digital radio frequency memory recorded on a computer readable medium. The medium comprises: a track and hold code section configured to track and hold the first radio frequency signal and to output a shaped signal; a digitizing code section configured to convert the shaped signal to a digital word; a storing code section configured to store the digital word in a memory; and a direct digital frequency synthesizer code section configured to provide a sampling clock signal, wherein the track and hold is based on the sampling clock signal. The digitizing code section may comprise a baseband modulation code section configured to digitize only a baseband modulation of the first radio frequency signal. The digitizing code section may comprise a carrier frequency removing section configured to remove a carrier frequency of the first radio frequency signal. The carrier frequency may be removed based on the Nyquist Theorem. The digital word may be stored in the memory based on the sampling clock signal. The medium may further comprise a Doppler sampling clock signal code section configured to provide a Doppler sampling clock signal.

The medium may further comprise: a baseband range determining code section configured to determine a baseband range for the first radio frequency signal based on the sampling clock signal.

The medium may further comprise: an intermediate frequency conversion code section configured to convert the digital word to an intermediate frequency signal; and a multiplying code section configured to multiply the intermediate frequency signal to a Nyquist range to generate the portion of the first radio frequency signal. The intermediate frequency may be multiplied based on the sampling clock signal.

The medium may further comprise: a Doppler sampling clock signal code section configured to provide a Doppler sampling clock signal; and a reading code section configured to read the digital word from the memory based on the Doppler sampling clock signal.

Additional features, advantages, and embodiments of the disclosure may be set forth or apparent from consideration of the following detailed description, drawings, and claims.

Moreover, it is to be understood that both the foregoing summary of the disclosure and the following detailed description are examples and are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

The embodiments of the disclosure and the various features and details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, even if not explicitly stated herein. Descriptions of well-known components and processing techniques may be omitted so as to not unnecessarily obscure teaching principles of the disclosed embodiments. The examples used herein are intended merely to facilitate an understanding of ways in which the disclosure may be practiced and to further enable those of skill in the art to practice disclosed the embodiments. Accordingly, the examples and embodiments herein should not be construed as limiting. Moreover, it is noted that like reference numerals represent similar parts throughout the several views of the drawings.

Figure 1:
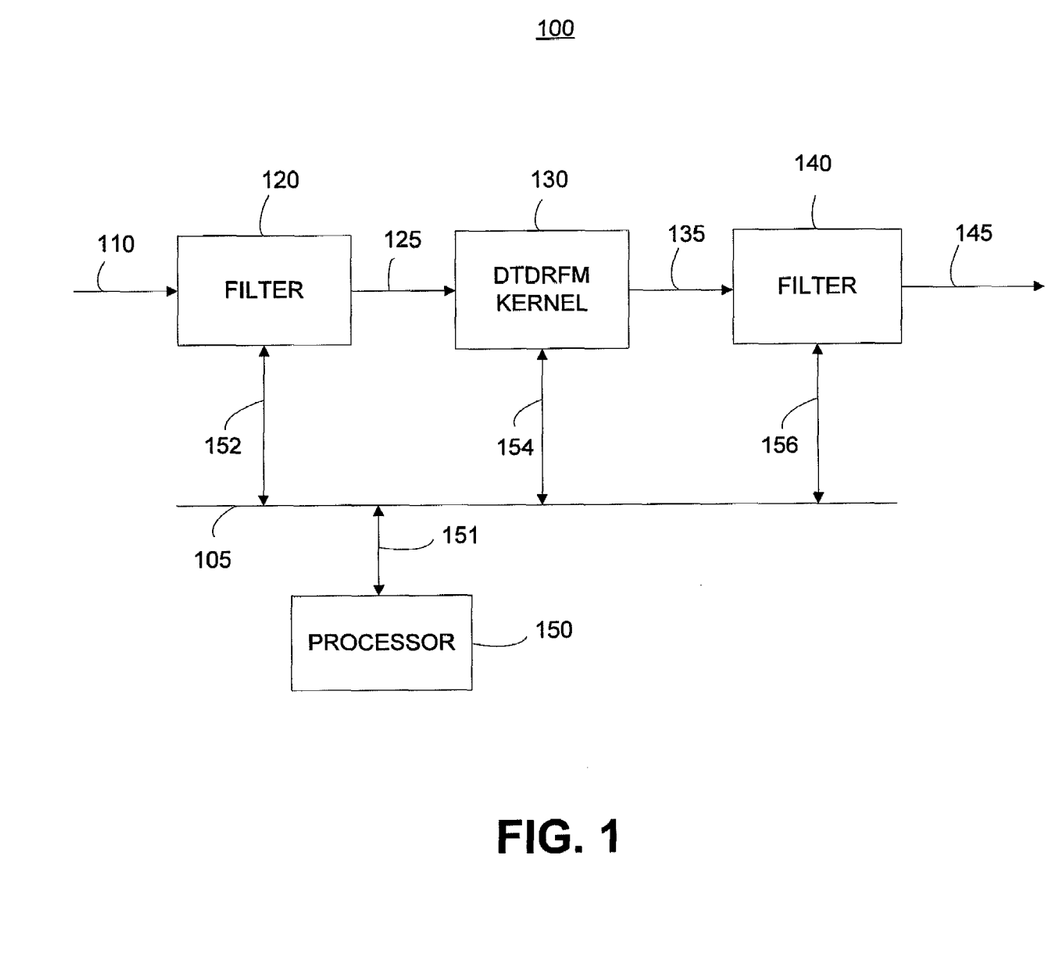
FIG. 1 shows an example of a simplified block diagram of a single band Digitally Tuned Digital Radio Frequency Memory (DTDRFM) Reconstructor, according to an embodiment of the disclosure.

FIG. 1 shows an example of a simplified block diagram of a single band Digitally Tuned Digital Radio Frequency Memory (DTDRFM) Reconstructor 100 according to an embodiment of the disclosure. The DTDRFM Reconstructor 100 includes a Filter 120, a DTDRFM Kernel 130, a Filter 140 and a Processor 150. The Processor 150 may be connected to the Filters 120, 140 and the DTDRFM Kernel 130 through a plurality of communication links 151, 152, 154, 156, and a Bus 105, as shown in FIG. 1. The plurality of communications links 151, 152, 154, 156 and Bus 105 may be configured to carry data bidirectionally between the Filters 120, 140, the DTDRFM Kernel 130 and the Processor 150, such as, for example, but not limited to, instruction signals, clocking signals, data signals, and the like.

The communication links 151, 152, 154, 156 may each be a wired link, a wireless link, an optical link, or any combination thereof. The communication links 151, 152, 154, 156 may include additional hardware to facilitate communication between the Filters 120, 140, the DTDRFM Kernel 130 and the Processor 150, such as, for example, but not limited to, relays, repeaters, and the like. Furthermore, the communication links 151, 152, 154, 156 and Bus 105 may be integrated into a network, such as, for example, a local area network (LAN), a wide area network (WAN), a personal area network (PAN), a broadband area network (BAN), and the like, any of which may be configured to communicate data via a wireless and/or a wired communication medium.

The Processor 150 may include any machine, device, circuit, component, or module, or any system of machines, devices, circuits, components, modules, or the like, which are capable of manipulating data according to one or more instructions, such as, for example, without limitation, a microprocessor, a central processing unit, a general purpose computer, a personal computer, a laptop computer, a palmtop computer, a notebook computer, a desktop computer, a workstation computer, a server, or the like, or an array of processors, microprocessors, central processing units, general purpose computers, personal computers, laptop computers, palmtop computers, notebook computers, desktop computers, workstation computers, servers, or the like.

The Filters 120 and 140 may each include, for example, one or more low-pass filters (LPFs) (not shown), high-pass filters (HPFs) (not shown), band pass filters (BPFs) (not shown), one or more switches (not shown), one or more amplifiers (not shown), and the like. Further, the Filters 120 and 140 may be configured to operate optimally in at least one RF signal band of interest, such as, for example, an L-band (1-2 GHz), an S-band (2-4 GHz), a C-band (4-8 GHz), an X-band (8-12 GHz), a $K_u$-band (12-18 GHz), or the like, without limitation. The Filter 140 may further include a multiplier (not shown) for multiplying a reconstructed (or synthesized) analog Intermediate Frequency (IF) signal from the DTDRFM Kernel 130 by a Doppler shift factor, resulting in a realistic Doppler shift in a captured frequency.

The DTDRFM Kernel 130 may include a high bandwidth Track and Hold (T&H) circuit, an analog-to-digital (ND) converter, a memory, a digital-to-analog (D/A) converter, a multiplier, a Capture Direct Digital Frequency Synthesizer (CDDS), and a clock, as described below with reference to FIG. 4 or FIG. 5. The DTDRFM Kernel 130 may be configured to provide all digital, wideband coherent jammer coverage without the complexity and cost of classic multi-band (or single band) up and down converters to increase the bandwidth of internal DRFM devices.

In FIG. 1, the Filter 120 may receive a single band radio frequency (RF) input channel signal 110 (such as, e.g., a 16 GHz signal), filter the RF input signal 110 and output a filtered RF input signal 125 to the DTDRFM Kernel 130. The DTDRFM Kernel 130 may digitize the filtered signal 125 from the Filter 120 into digital words and store the digital words in a memory (not shown). The DTDFRM Kernel 130 may store the digital words for a selected period of time before outputting the digital words as a reconstructed (or synthesized) Intermediate Frequency (IF) signal 135 to the Filter 140. The Filter 140 may filter the reconstructed IF signal 135 and output an RF transmission channel signal 145.

The output RF transmission channel signal 145 may be coherent with the received RF channel signal 110.

Figure 2:
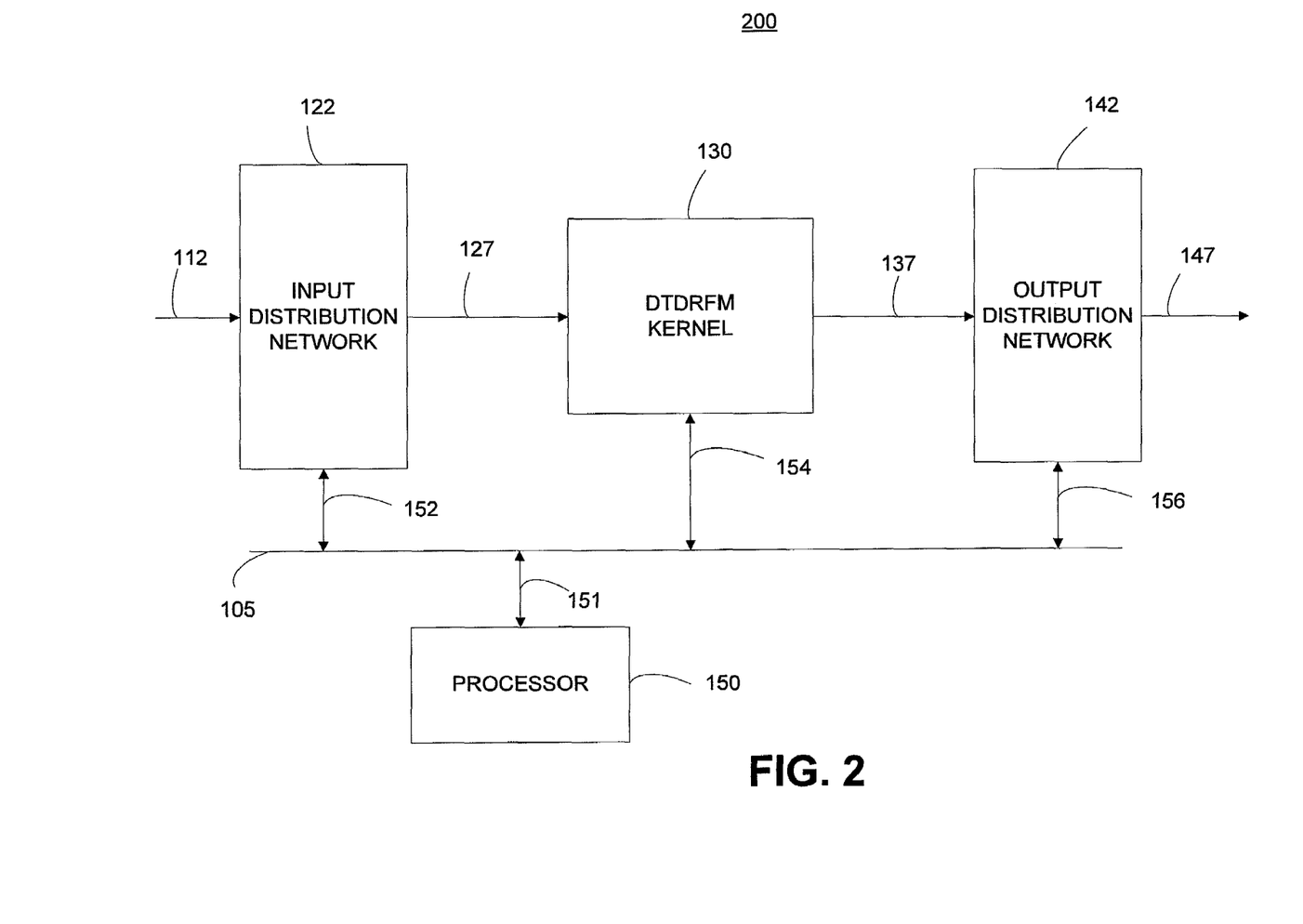
FIG. 2 shows an example of a simplified block diagram of a multi-band DTDRFM Reconstructor, according to a further embodiment of the disclosure.

FIG. 2 shows an example of a simplified block diagram of a multi-band DTDRFM Reconstructor 200, according to a further embodiment of the disclosure. The multi-band DTDRFM Reconstructor 200 includes an Input Distribution Network (IDN) 122, the DTDRFM Kernel 130, an Output Distribution Network (ODN) 142 and the Processor 150. The IDN 122 and ODN 142 may each include one or more low-pass filters (LPFs) (not shown), one or more high-pass filters (HPFs) (not shown), one or more band pass filters (BPFs) (not shown), one or more switches (not shown), one or more amplifiers (not shown) and the like, which are configured to operate optimally in RF bands of interest (such as, e.g., L-band, S-band, C-band, X-band, $K_u$-band, and the like, without limitation). The DTDRFM Kernel 130, Processor 150, communication links 151, 152, 154, 156 and Bus 105 may be similar to those shown in FIG. 1 with corresponding reference numerals.

In FIG. 2, the IDN 122 may receive a multi-band (RF) channel input signal 112, from which it may select one or more bands, filter the selected one or more bands and output the filtered one or more bands as a filtered input signal 127 to the DTDRFM Kernel 130. The DTDRFM Kernel 130 may digitize the filtered input signal 127 into digital words and store the digital words in a memory (not shown), such as, e.g., but not limited to, a Random Access Memory (RAM). The DTDFRM Kernel 130 may store the digital words for a predetermined period of time, or based on characteristics of the received multi-band RF input signal 112, before outputting the digital words as a reconstructed Intermediate Frequency (IF) signal 137 to the ODN 142. The ODN 142 may filter the reconstructed IF signal 137 and output an RF transmission channel signal 147. The output RF transmission channel signal 147 may be coherent with the multi-band RF input signal 112, such that, for example, the RF transmission channel signal 147 may be perceived by enemy radar as a false target.

Although the single band DTDRFM 100 (shown in FIG. 1) and the multi-band DTDRFM 200 (shown in FIG. 2) are shown to include a single DTDRFM Kernel 130, it is noted that multiple DTDRFM Kernels 130 may be used simultaneously, with dedicated DTDRFM Kernels 130 provided in parallel for each RF signal band to be captured and retransmitted (or synthesized).

Figure 3:
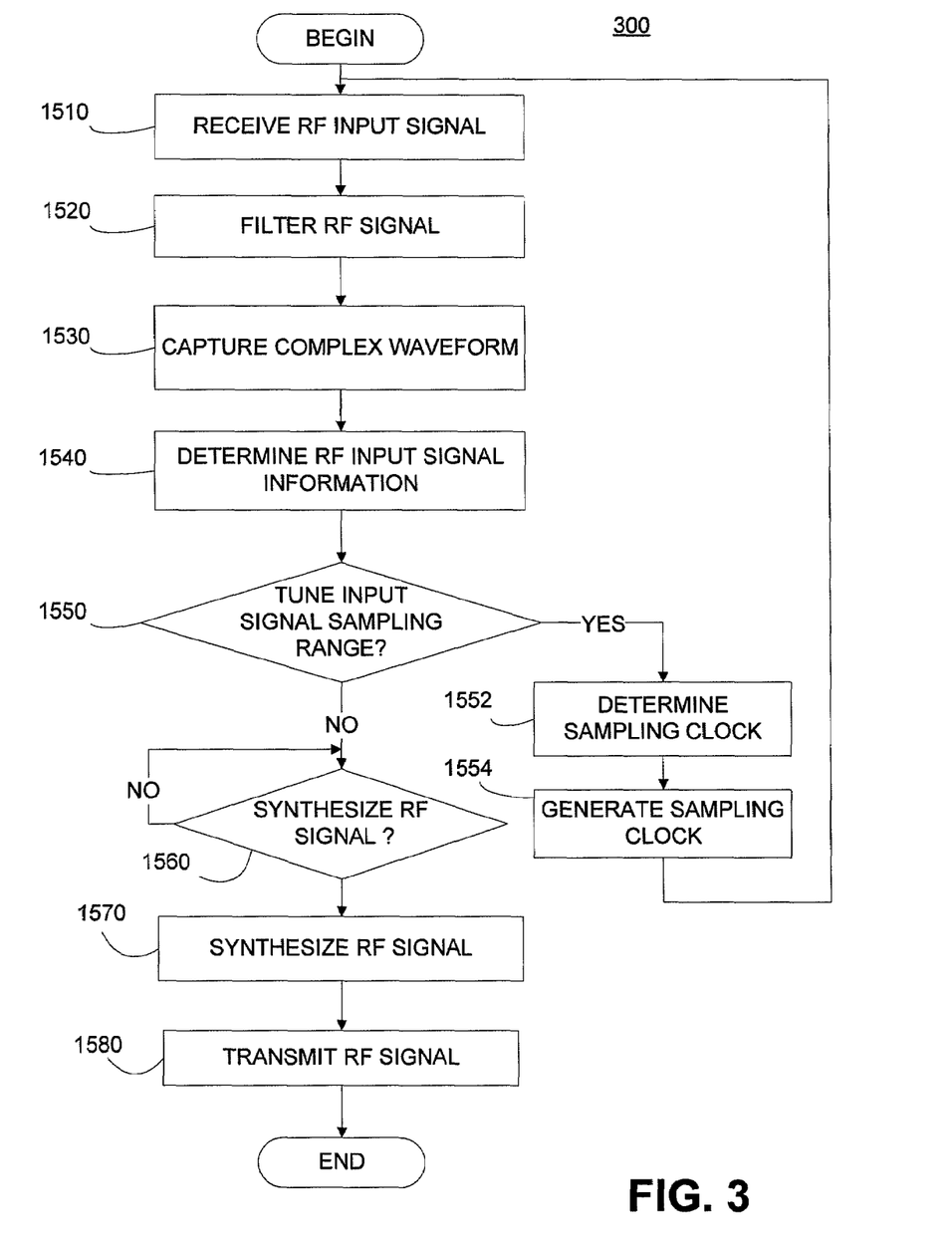
FIG. 3 shows an example of a radio frequency (RF) signal reconstruction process that may be used with, for example, the DTDRFM Reconstructor in FIG. 1 or FIG. 2.

FIG. 3 shows an example of a radio frequency (RF) signal reconstruction process 300 that may be used with, for example, the single band DTDRFM Reconstructor 100 shown in FIG. 1, or the multi-band DTDRFM Reconstructor 200 shown in FIG. 2. The following is an example of the reconstruction process 300 carried out with the single band DTDRFM Reconstructor 100 (shown in FIG. 1). It is noted that the reconstruction process 300 may be similarly carried out with the DTDRFM Reconstructor 200 (shown in FIG. 2).

Referring to FIGS. 1 and 3, an RF input signal 110 is received by the Filter 120 (Step 1510). The Filter 120 filters the received RF input signal 110 and outputs a filtered signal 125 (Step 1520). The filtered signal 125 is received from the Filter 120 by the DTDRFM 130, which converts the filtered signal 125 to a digital signal and captures a complex waveform (Step 1530). Based on the captured complex waveform, the Processor 150 may determine information about the received RF input signal 110 (Step 1540). The determined information may include, for example, without limitation, any one or more of the following information about the RF input signal 110: a time of arrival (TOA), a frequency, a pulse width (PW), a frequency modulation pulse (FMOP), a pulse modulation pulse (PMP), a signal amplitude, and the like. A determination may be made whether the sample range of the received RF input signal 110 should be tuned (Step 1550).

If a determination is made that the sample range of the received RF input signal 110 should be tuned ("YES" at Step 1550), then a sampling clock value may be determined for sampling the received RF input signal 110 (Step 1552). The sampling clock may be generated based on the determined sampling clock value (Step 1554). The generated sampling clock may be applied to, for example, the Filter 120 or the DTDRFM 130 as a sampling clock signal for receiving a further RF input signal (Step 1510).

If a determination is made that the sample range of the received RF input signal 110 should not be tuned ("NO" at Step 1550), then a determination may be made whether the RF transmission signal 145 is to be synthesized (constructed) (Step 1560). If a determination is made to synthesize (construct) the RF transmission signal 145 ("YES" at Step 1560), then the RF signal is synthesized (Step 1570) and transmitted (Step 1580), otherwise the process waits until a determination is made to synthesize the RF signal ("NO" at Step 1560).

Although the process 300 is shown and described with the Steps 1510 through 1580 provided in the order shown in FIG. 3, it is noted that the disclosure is not limited to the example shown in FIG. 3. The sequence of steps may be altered without departing from the scope or spirit of the disclosure. For example, the determination of tuning (Step 1550) may be performed before receiving the RF signal (Step 1510). Further, the process may return to capture a complex waveform (Step 1530) after generating a sampling clock (Step 1554). Other modifications will be obvious to those skilled in the art.

According to a further aspect of the disclosure, a computer program is provided on a tangible recording medium having a code section for each of the steps (i.e., Steps 1510 to 1580) shown in FIG. 3 and described herein, such that when executed on, for example, the Processor 150, the code sections cause the process 300 shown in FIG. 3 to be carried out.

Figure 4:
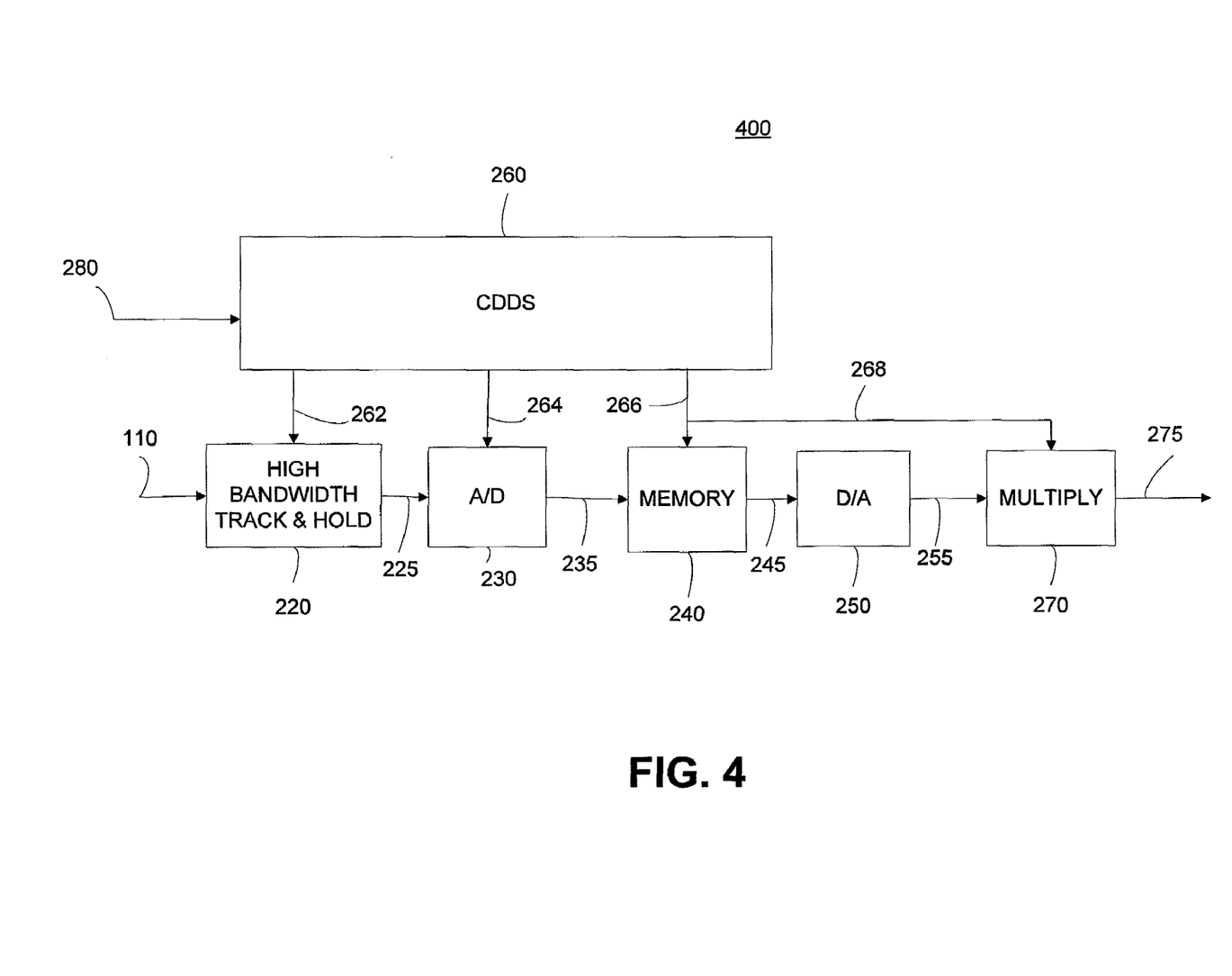
FIG. 4 shows an example of a DTDRFM according to an embodiment of the disclosure.

FIG. 4 shows an example of a DTDRFM 400 according to an embodiment of the disclosure. The DTDRFM 400 includes a high bandwidth Track and Hold (T&H) circuit 220, an analog to digital (A/D) converter 230, a Memory 240, a digital to analog (D/A) converter 250, a Capture Direct Digital Frequency Synthesizer (CDDS) 260 and a Multiplier 270. The DTDRFM 400 is configured to receive the high bandwidth radio frequency (RF) input signal 110 and directly sample and convert the RF input signal 110 to digital words 235 using the high bandwidth T&H circuit 220 and the A/D 230. The digital words 235 output from the A/D 230 may be stored in the Memory 240 until the digital words are to be reconstructed and transmitted by the DTDRFM 400 as a duplicate or copy of the RF input signal 110. The CDDS 260 may be configured to receive a synchronizing clock signal 280 from, for example, a local phased locked loop (PLL) (not shown), or the like.

The T&H circuit 220 may be configured to receive the RF input signal 110 from, for example, an antenna (not shown), or the like, and a sampling clock signal from the CDDS 260 over a line 262. The T&H circuit 220 may be configured to have a bandwidth greater than a carrier frequency of the RF input signal 110, such as, for example, but not limited to, 16 GHz. The T&H circuit 220 is configured to track and hold the received RF input signal 110 and output a Track-Hold (or shaped) signal 225 to the A/D 230 (or digitizer) on a basis of the sampling clock signal received over the line 262.

The A/D 230 is configured to receive the analog Track-Hold (shaped) signal 225 from the T&H circuit 220. The A/D 230 is further configured to receive the sampling clock signal from the CDDS 260 over a line 264. The A/D 230 converts the Track-Hold (shaped) signal 225 to digital words 235 and forwards the words to the Memory 240 on a basis of the sampling clock signal from the CDDS 260. The digital words 235 may have a length of, for example, eight bits, sixteen bits, thirty-two bits, or the like, without limitation.

The T&H circuit 220 and ND 230 together down-convert the high bandwidth RF input signal 110 to the digital words 235. In particular, the T&H circuit 220 and ND 230 receive the sampling clock signal from the CDDS 260 at a clock rate sufficient to cover a base band frequency of interest for the received RF input signal 110 and convert the analog high bandwidth RF input signal 110 to the digital words 235. In this regard, the T&H circuit 220 and ND 230 operate on the basis of the sampling clock signal received from the CDDS 260 (via lines 262, 264, respectively) to down-convert the high bandwidth RF input signal 110 and remove the carrier frequency of the RF input signal 110 based on the Nyquist Theorem. Thus, the T&H circuit 220 and ND 230 can sample the high bandwidth RF input signal 110 using a lower conversion rate ND 230.

The Memory 240 is configured to receive the digital words 235 from the ND 230. The Memory 240 is further configured to receive a sampling clock signal from the CDDS 260 over a line 266. The Memory 240 receives and writes the digital words 235 into, for example, memory cells on a basis of the sampling clock signal from the CDDS 260. The digital words 235 may be retained in the Memory 240 until, for example, a predetermined time, or until a specific synthesize (construct) instruction is received, at which point the Memory 240 may read out the digital words 245 and output the words to the D/A 250 on the basis of the sampling clock signal from the CDDS 260.

The D/A 250 is configured to receive the digital words 245 from the Memory 240. The D/A 250 converts the digital words 245 to an analog intermediate frequency (IF) signal 255. The D/A 250 outputs the IF signal 255 to an input of the Multiplier 270.

The Multiplier 270 is configured to receive the IF signal 255 from the D/A 250. The Multiplier 270 is further configured to receive a sampling clock signal from the CDDS 260 over a line 268. The Multiplier 270 multiplies the IF signal 255 to output the RF transmit signal 275, including Nyquist ranges, on a basis of the sampling clock signal received from the CDDS 260. The RF transmit signal 275 may then be transmitted by a transmitter (not shown), which may include one or more emitters (not shown).

Figure 5:
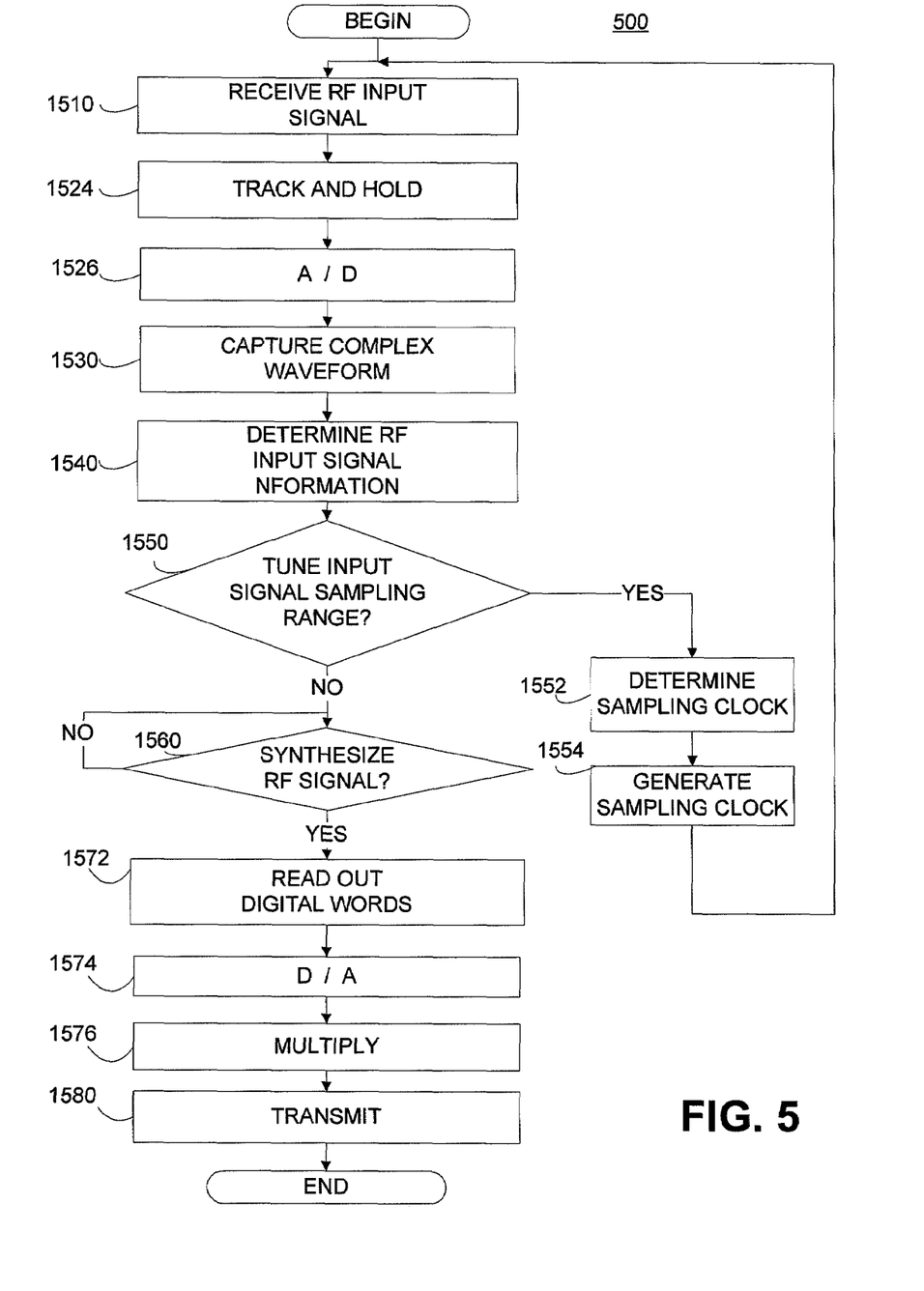
FIG. 5 shows an example of a radio frequency (RF) signal reconstruction process that may be used with, for example, the DTDRFM Reconstructor in FIG. 4.

FIG. 5 shows an example of an RF signal reconstruction process 500 that may be used with, for example, the DTDRFM 400 shown in FIG. 4. It is noted, however, the process 500 may have uses beyond the DTDRFM 400 shown in FIG. 4, as those skilled in the art will readily recognize.

Referring to FIGS. 4 and 5, initially, the RF input signal 110 is received from, e.g., an antenna (not shown) and forwarded to the T&H circuit 220 (Step 1510). The T&H circuit 220 tracks and holds the RF input signal 110 based on the sampling clock signal received on the line 262 (Step 1524). The T&H circuit 220 outputs the Track-Hold signal 225 to the ND 230, which converts the analog Track-Hold signal 225 to digital words 235 based on the sampling clock signal received on the line 264 (Step 1526). The digital words 235 may be captured and stored in the Memory 240 as a representation of a finite complex waveform from the RF input signal 110 (Step 1530). The writing of the digital words 235 in, for example, memory cells (not shown) in the Memory 240 is based on the sampling clock signal received over the line 266 from the CDDS 260. Information may be determined about the received RF input signal 110 based on the captured complex waveform (Step 1540). For instance, any one or more of the following types of information may be determined, without limitation, about the RF input signal 110, including: a time of arrival (TOA), a frequency, a pulse width (PW), a frequency modulation pulse (FMOP), a pulse modulation pulse (PMP), a signal amplitude, and the like.

A determination may be made whether the sample range of the received RF input signal 110 should be tuned (Step 1550). The determination may be based on, for example, the determined information about the received RF input signal 110. If a determination is made that the sample range of the received RF input signal 110 should be tuned ("YES" at Step 1550), then a sampling clock value may be determined for sampling the received RF input signal 110 (Step 1552). The sampling clock may be generated based on the determined sampling clock value (Step 1554). The generated sampling clock value may be applied to, for example, the CDDS 260 to adjust the sampling clock signal provided on the lines 262, 264, 266 and 268, and another portion of the received RF input signal 110 may be received and captured using the adjusted sampling clock signal (Step 1510). In this regard, the sampling clock signal may be adjusted internally by the CDDS 260, or externally by adjusting the clock signal 280 applied to the CDDS 260. Thus, the input sample range of the received RF input signal 110 may be tuned by adjusting the sampling clock signal applied to the T&H circuit 220 (via line 262) and the ND 230 (via line 264).

If a determination is made that the sample range of the received RF input signal 110 should not be tuned ("NO" at Step 1550), then a determination may be made whether to synthesize (construct) an RF transmit signal 275 (Step 1560). The determination may be based, for example, on the passing of a predetermined amount of time, the information determined about the RF input signal 110 (such as, e.g., a pulse repetition interval (PRI), the TOA, the frequency, the PW, the FMOP, the PMOP, or the like), on a received instruction to synthesize (construct), and the like.

If a determination is made to synthesize the RF transmission signal 275 ("YES" at Step 1560), then the digital words 245 are read from the Memory 240 based on the sampling clock signal received on the line 266 (Step 1572), otherwise the process waits until a determination is made to synthesize the RF signal ("NO" at Step 1560). The digital words 245 are received by the D/A 250 and converted to an analog IF signal 255 (Step 1574). The IF signal 255 is applied to an input of the Multiplier 270, where it may be multiplied on the basis of the sampling clock signal received on the line 268, such that RF transmit signal 275, which may include Nyquist ranges, is a multiplication of the frequency stored in the Memory 240 with the change in the sampling clock signal (Step 1576). The RF transmit signal 275 is transmitted by a transmitter (not shown), so as to be coherent with the RF input signal 110 (Step 1580).

Although the process 500 is shown and described with the Steps 1510 through 1580 provided in the order shown in FIG. 5, it is noted that the disclosure is not limited to the example shown in FIG. 5. The sequence of steps may be altered without departing from the scope or spirit of the disclosure. For instance, the determination of tuning (Step 1550) may be performed before receiving the RF input signal (Step 1510). Other modifications will be obvious to those skilled in the art.

According to a further aspect of the disclosure, a computer program is provided on a tangible recording medium having a code section for each of the Steps 1510 through 1580 shown in FIG. 5 and described herein, such that when executed in a general purpose computer, the code sections cause the computer to carry out the process 500 shown in FIG. 5.

Figure 6:
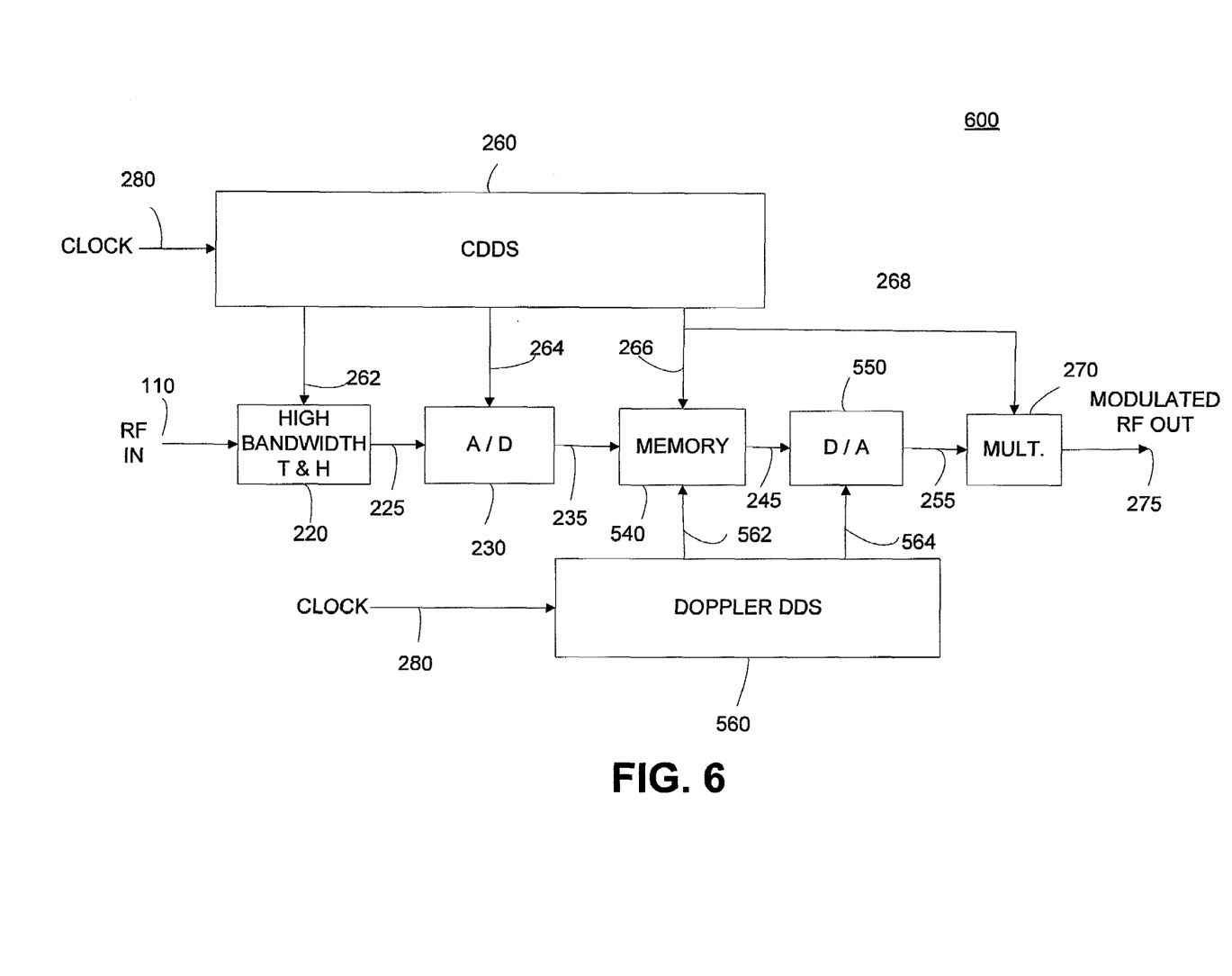
FIG. 6 shows an example of a DTDRFM according to another embodiment of the disclosure.

FIG. 6 shows an example of a DTDRFM 600 according to an embodiment of the disclosure. The DTDRFM 600 includes the high bandwidth Track and Hold (T&H) circuit 220, the A/D 230, the CDDS 260, a Memory 540, a D/A 550, a Doppler Direct Digital Frequency Synthesizer (Doppler DDS) 560 and the Multiplier 270, where the T&H circuit 220, A/D 230, CDDS 260 and the Multiplier 270 are similar to their corresponding counterparts described above with regard to FIG. 4. The Memory 540 may be similar to the Memory 240, shown in FIG. 4, except that the read clock signal used to read data from, e.g., memory cells (not shown), may be different from the write clock signal used to write data to the memory cells. Furthermore, the D/A 550 may be similar to the D/A 250, except that the digital to analog conversion is based on the Doppler sampling clock signal from the Doppler DDS 560.

Further to the description provided above for the DTDRFM 400 shown in FIG. 4, the DTDRFM 600 includes the Doppler DDS 560. The Doppler DDS 560 is configured to generate a Doppler sampling clock signal on the basis of the synchronizing clock signal 280. The Doppler DDS 560 is further configured to provide the Doppler sampling clock signal to the Memory 540 over a line 562 and the D/A 550 over a line 564.

According to an aspect of the disclosure, the Multiplier 270 may multiply the IF signal 255 based on the sampling clock received on the line 268, such that the output RF transmit signal 275 is adjusted by a Doppler shift factor β with regard to the RF input signal 110. In this regard, the entire signal frequency spectrum of the IF signal 255 is multiplied by the Doppler shift factor β, thereby emulating a true Doppler shift. The Doppler shift factor β may be derived from, for example, but is not limited to the following equations:

$$\beta = \alpha \cos \theta \quad (1).$$

$$\lambda_F = \lambda_0(1-\beta) \quad (2).$$

$$\lambda_R = \lambda_0(1+\beta) \quad (3).$$

$$f_F = f_0(1\beta) \quad (4).$$

$$f_R = f_0(1+\beta) \quad (5).$$

In the above Equations (1) to (5): $\alpha$ is an absolute Doppler shift factor; $\beta$ is a perceived Doppler shift factor along a line of sight from a target to an enemy receiver; $\theta$ is an angle between the target's forward velocity and the line of sight from the target to the enemy receiver; $\lambda_0$ is a wavelength of a transmitted RF signal; $\lambda_F$ is a wavelength of an RF signal received by the enemy receiver that has been reflected by an oncoming target, i.e., moving toward the receiver; $\lambda_R$ is a wavelength of an RF signal received by the enemy receiver that has been reflected by a target moving away from the receiver; $f_0$ is a frequency of the transmitted RF signal; $f_F$ is a frequency of an RF signal received by the enemy receiver that has been reflected by an oncoming target, moving toward the enemy receiver; and $f_R$ is a frequency of an RF signal received by the enemy receiver that has been reflected by a target moving away from the receiver.

Although the above equations are provided for a target moving in a two-dimensional plane for the purpose of simplicity, it is noted that the disclosure applies to targets moving in the three-dimensional real word coordinate system.

Figure 7:
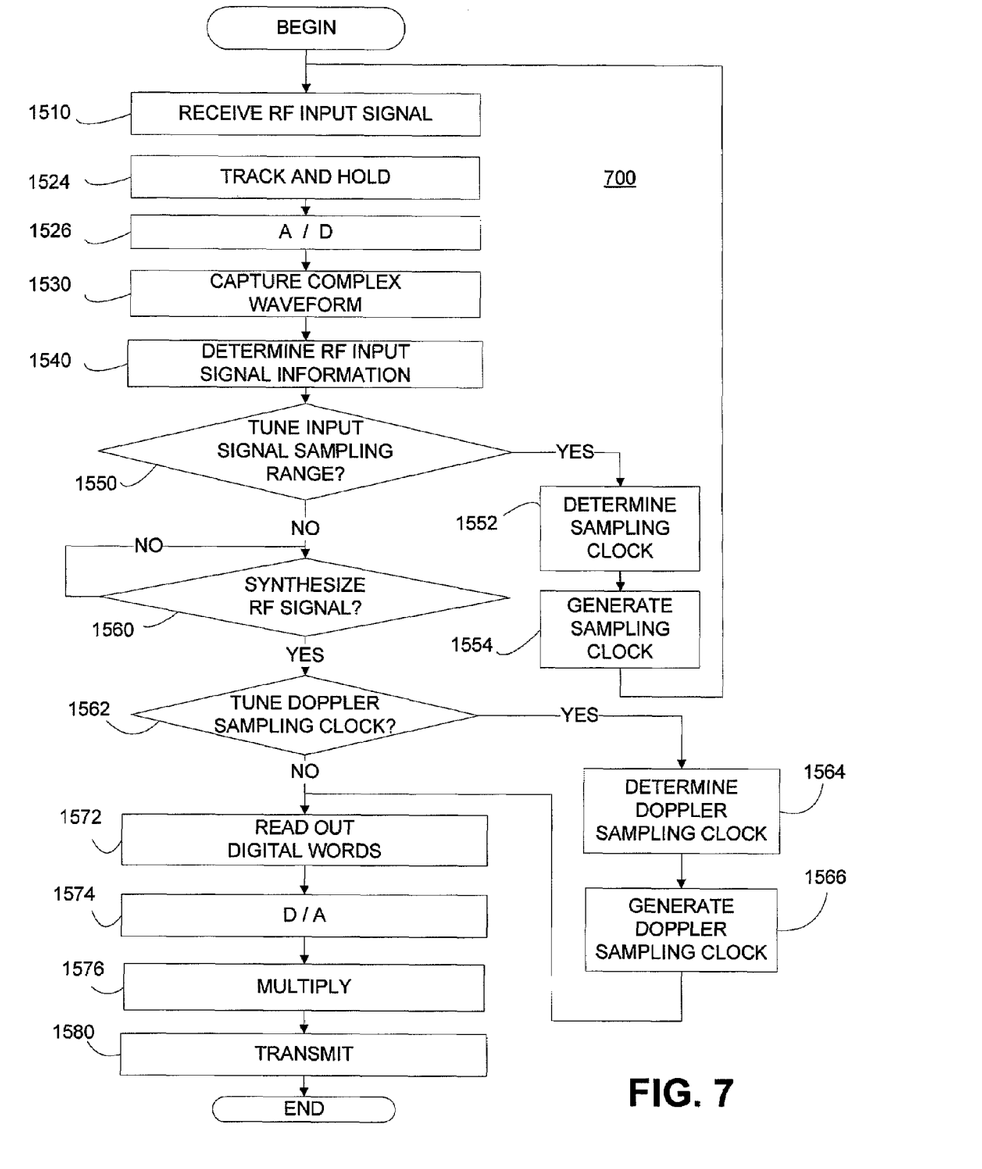
FIG. 7 shows an example of an RF signal reconstruction process that may be used with, for example, the DTDRFM in FIG. 6.

FIG. 7 shows an example of a reconstruction process 700 that may be used with, for example, the DTDRFM 600 shown in FIG. 6. It is noted, however, the process 700 may have uses beyond the DTDRFM 600 shown in FIG. 6, as those skilled in the art will readily recognize. Since the T&H circuit 220, A/D 230, CDDS 260 and Multiplier 270 operate in a similar manner to those similarly numbered elements in FIG. 4, the description provided above with regard to Step 1510 through Step 1560 and Step 1572 through Step 1580 of the reconstruction process 500 (shown in FIG. 5) is equally applicable here and, therefore, will not be repeated.

Referring to FIG. 6 and FIG. 7, after a determination is made to synthesize the RF transmission signal 275 ("YES" at Step 1560), then a determination may be made whether to tune (or adjust) the Doppler sampling clock signal output by the Doppler DDS 560 (Step 1562). If a determination is made to tune the Doppler sampling clock signal ("YES" at Step 1562), then a Doppler sampling clock value may be determined (Step 1564). The Doppler sampling clock may be generated based on the determined Doppler sampling clock value (Step 1566). The generated Doppler sampling clock value may be applied to, for example, the Doppler DDS 560 to adjust the Doppler sampling clock signal provided on the lines 562 and 564 to the Memory 540 and D/A 550. In this regard, the Doppler sampling clock signal may be adjusted internally by the Doppler DDS 560, or externally by adjusting the clock signal 280 applied to the Doppler DDS 560. Thus, the read out (play back) of the Memory 540 (Step 1572) and the D/A 550 (Step 1574) may be tuned (or adjusted) by adjusting the Doppler sampling clock signal applied to the lines 562 and 564.

Although the process 700 is shown and described with the Steps 1510 through 1580 provided in the order shown in FIG. 7, it is noted that the disclosure is not limited to the example shown in FIG. 7. For example, the sequence of steps may be altered without departing from the scope or spirit of the disclosure. For instance, the determination of tuning (Step 1550) may be performed before receiving the RF input signal (Step 1510). Other modifications will be obvious to those skilled in the art.

According to a further aspect of the disclosure, a computer program is provided on a tangible recording medium having a code section for each of the Steps 1510 through 1580 shown in FIG. 7 and described herein, such that when executed in a general purpose computer, the code sections cause the computer to carry out the process 700 shown in FIG. 7.

While the disclosure has been described in terms of example embodiments, those skilled in the art will recognize that the invention can be practiced with switchable modifications in the spirit and scope of the appended claims. These examples given above are merely illustrative and are not meant to be an exhaustive list of all possible designs, embodiments, applications or modifications of the disclosure.

What is claimed is:

1. A digitally tuned digital radio frequency memory that captures a portion of a first radio frequency signal and retransmits the portion as a coherent radio frequency signal, the digitally tuned radio frequency memory comprising:
    a track and hold configured to track and hold the first radio frequency signal and to output a shaped signal;
    a digitizer configured to convert the shaped signal to a digital word;
    a memory configured to store the digital word; and
    a direct digital frequency synthesizer configured to provide a sampling clock signal,
    wherein the sampling clock signal is provided to the track and hold.

2. The digitally tuned digital radio frequency memory according to claim 1, wherein the digitizer comprises an input configured to receive the sampling clock signal.

3. The digitally tuned digital radio frequency memory according to claim 1, wherein the digitizer comprises a lower conversion rate analog to digital converter.

4. The digitally tuned digital radio frequency memory according to claim 1, wherein the digitizer is further configured to digitize only a baseband modulation of the first radio frequency signal.

5. The digitally tuned digital radio frequency memory according to claim 1, wherein the digitizer is further configured to remove a carrier frequency of the first radio frequency signal.

6. The digitally tuned digital radio frequency memory according to claim 5, wherein the carrier frequency is removed based on the Nyquist Theorem.

7. The digitally tuned digital radio frequency memory according to claim 1, wherein the track and hold and digitizer are each configured to receive the sampling clock signal to determine a baseband range for the first radio frequency signal.

8. The digitally tuned digital radio frequency memory according to claim 1, further comprising:
   a digital to analog converter configured to convert the digital word to an intermediate frequency signal; and
   a multiplier configured to multiply the intermediate frequency signal to a Nyquist range.

9. The digitally tuned digital radio frequency memory according to claim 8, wherein the multiplier is further configured to multiply the intermediate frequency signal by the Nyquist range based on the sampling clock signal.

10. The digitally tuned digital radio frequency memory according to claim 1, wherein the memory is further configured to store the digital word based on the sampling clock signal.

11. The digitally tuned digital radio frequency memory according to claim 1, further comprising:
    a Doppler direct digital frequency synthesizer configured to provide a Doppler sampling clock signal.

12. The digitally tuned digital radio frequency memory according to claim 10, further comprising:
    a Doppler direct digital frequency synthesizer configured to provide a Doppler sampling clock signal,
    wherein the memory is further configured to playback the digital word based on the Doppler sampling clock signal.

13. A method for capturing a portion of a first radio frequency signal and retransmitting the portion as a coherent radio frequency signal using a digitally tuned digital radio frequency memory, the method comprising:
    tracking and holding the first radio frequency signal to output a shaped signal;
    converting the shaped signal to a digital word;
    storing the digital word in a memory; and
    providing a sampling clock signal from a direct digital frequency synthesizer,
    wherein the tracking and holding is based on the sampling clock signal.

14. The method according to claim 13, wherein the digitizing comprises digitizing only a baseband modulation of the first radio frequency signal.

15. The method according to claim 13, wherein the digitizing comprises removing a carrier frequency of the first radio frequency signal.

16. The method according to claim 15, wherein the carrier frequency is removed based on the Nyquist Theorem.

17. The method according to claim 13, further comprising:
    determining a baseband range for the first radio frequency signal from the tracking and holding and digitizing based on the sampling clock signal.

18. The method according to claim 13, further comprising:
    converting the digital word to an intermediate frequency signal; and
    multiplying the intermediate frequency signal to a Nyquist range to generate the portion of the first radio frequency signal.

19. The method according to claim 18, wherein the multiplying is based on the sampling clock signal.

20. The method according to claim 13, wherein the storing is based on the sampling clock signal.

21. The method according to claim 13, further comprising: providing a Doppler sampling clock signal.

22. The method according to claim 20, further comprising:
    providing a Doppler sampling clock signal; and
    reading the digital word from the memory based on the Doppler sampling clock signal.

23. A program for capturing a portion of a first radio frequency signal and retransmitting the portion as a coherent radio frequency signal using a digitally tuned digital radio frequency memory recorded on a computer readable medium, the medium comprising:
    a track and hold code section configured to track and hold the first radio frequency signal and to output a shaped signal;
    a digitizing code section configured to convert the shaped signal to a digital word;
    a storing code section configured to store the digital word in a memory; and
    a direct digital frequency synthesizer code section configured to provide a sampling clock signal,
    wherein the track and hold is based on the sampling clock signal.

24. The medium according to claim 23, wherein the digitizing code section comprises a baseband modulation code section configured to digitize only a baseband modulation of the first radio frequency signal.

25. The medium according to claim 23, wherein the digitizing code section comprises a carrier frequency removing section configured to remove a carrier frequency of the first radio frequency signal.

26. The medium according to claim 25, wherein the carrier frequency is removed based on the Nyquist Theorem.

27. The medium according to claim 23, further comprising:
    a baseband range determining code section configured to determine a baseband range for the first radio frequency signal based on the sampling clock signal.

28. The medium according to claim 23, further comprising:
    an intermediate frequency conversion code section configured to convert the digital word to an intermediate frequency signal; and
    a multiplying code section configured to multiply the intermediate frequency signal to a Nyquist range to generate the portion of the first radio frequency signal.

29. The medium according to claim 28, wherein the intermediate frequency is multiplied based on the sampling clock signal.

30. The medium according to claim 23, wherein the digital word is stored in the memory based on the sampling clock signal.

31. The medium according to claim 23, further comprising:
    a Doppler sampling clock signal code section configured to provide a Doppler sampling clock signal.

32. The medium according to claim 30, further comprising:
    a Doppler sampling clock signal code section configured to provide a Doppler sampling clock signal; and
    a reading code section configured to read the digital word from the memory based on the Doppler sampling clock signal.

* * * * *